3,256,290
4-METHOXYPOLYCHLOROPYRIDINES
Howard Johnston, Concord, and Mary S. Tomita, Walnut Creek, Calif., assignors to The Dow Chemical Company, Midland, Mich., a corporation of Delaware
No Drawing. Filed June 21, 1963, Ser. No. 289,720
3 Claims. (Cl. 260—297)

This invention is directed to 4-methoxypolychloropyridines having the formula

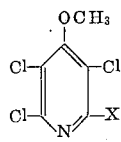

In this and succeeding formulas, X is chloro or hydrogen. The new compounds are white crystalline solids, soluble in numerous organic solvents such as carbon tetrachloride, perchloroethylene, diethyl ether, pentane, hexane, acetone, etc., and substantially insoluble in water. The compounds are useful as pesticides and are adapted to be employed for the control of various pests such as soil-dwelling organisms, household insects, microorganisms, plant-infesting insects, weeds and animal infesting pests.

The compounds of the present invention may be prepared by mixing together and reacting sodium methoxide and an appropriate polychloropyridine compound having the formula

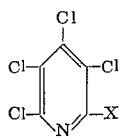

whereupon the desired 4-methoxypolychloropyridine compound and sodium chloride by-product are formed. In the preparation, the amounts of the reactants to be employed are not critical, some of the desired product being obtained when any proportion of the ingredients is employed. Good results are obtained when substantially equimolecular proportions of sodium methoxide and polychloropyridine compound are employed. The reactants are preferably brought together in a solvent such as methanol. The reaction is conveniently carried out at temperatures from ambient temperature to the reflux temperature of the reaction mixture. The preferred method contemplates carrying out the reaction in methanol solvent and at the reflux temperature of the reaction mixture in methanol. During the heating the 4-methoxypolychloropyridine product and sodium chloride by-product are formed in the reaction medium with the sodium chloride precipitating therefrom. The resulting mixture is filtered to remove the sodium chloride. The filtrate may be subjected to reduced pressure to vaporize off the solvent and recover the product as residue or may be allowed to stand to precipitate the product which is then recovered by filtration. The product may be purified by washing and/or recrystallizing from suitable organic solvents, such as hexane or pentane.

In a preferred method for carrying out the reaction, sodium methoxide is prepared in situ by adding metallic sodium to excess methanol to produce a methanolic solution of sodium methoxide and thereafter adding to the resulting solution the appropriate polychloropyridine compound. The resulting mixture is then heated at reflux temperature, preferably from about 4 hours to overnight, to obtain the desired 4-methoxypolychloropyridine product and sodium chloride by-product. Following the reaction, the product is separated and purified as previously described.

The following examples illustrate the invention but are not to be construed as limiting:

Example 1.—4-methoxy-2,3,5,6-tetrachloropyridine 0.92 gram (0.04 gram atom) of metallic sodium was added in small pieces to 100 milliliters of dry methanol with stirring whereupon an exothermic reaction took place with the formation of sodium methoxide which remained dissolved in the excess methanol. To the resulting mixture was added, while stirring, 10 grams (0.04 mole) of pentachloropyridine and the mixture then heated to reflux temperature and heated under reflux for about 8 hours. During the heating, a reaction took place with the formation of the desired 4-methoxy-2,3,5,6-tetrachloropyridine product and sodium chloride by-product. The sodium chloride by-product which separated as a precipitate during the course of the heating was removed by filtration on completion of the heating and the filtrate containing the desired product allowed to cool and stand overnight whereupon the desired product precipitated. The product was recovered by filtration and recrystallized from hexane to obtain the purified product as a white crystalline solid having a melting point of 107°–109° C. The yield of the product was 7.3 grams or 74.5 percent of theoretical. The product had elemental analyses (in percent) as follows:

Theory: carbon, 29.1; hydrogen, 1.2; nitrogen, 5.7; chlorine, 57.5. Found: carbon, 29.26; hydrogen, 1.3; nitrogen, 5.6; chlorine, 57.4.

Example 2.—4-methoxy-2,3,5-trichloropyridine

In a manner similar to that described in Example 1, 0.85 gram (0.037 gram atom) of metallic sodium was added in small pieces to 60 milliliters of dry methanol to obtain sodium methoxide which remained in solution. To the methanolic solution of sodium methoxide was added while stirring 8.0 grams (0.037 mole) of 2,3,4,5-tetrachloropyridine and the mixture heated at reflux temperature for about 4 hours whereupon a reaction took place with the formation of the desired 4-methoxy-2,3,5-trichloropyridine product and sodium chloride by-product. On completion of the heating, the sodium chloride by-product was removed by filtration and the filtrate subjected to reduced pressure to vaporize off the solvent and to recover the desired 4-methoxy-2,3,5-trichloropyridine product. The product was recrystallized from hexane to obtain a purified product having a melting point of 60°–64° C. The product had elemental analyses (in percent) as follows:

Theory: carbon, 34; hydrogen, 1.88; nitrogen, 6.57; chlorine, 50.1. Found: carbon, 33.9; hydrogen, 2.07; nitrogen, 6.39; chlorine, 49.88.

The products of the present invention are useful in various pesticidal applications. Thus, they may be employed as toxic constituents of insecticides and miticides for the control of such pests as confused flour beetle, house fly, stable fly, American roach, 2-spotted spider mite, etc. They are also useful for the control of soil dwelling pests such as nematodes. Another area of usefulness is in the control of microorganisms such as bacteria and fungi. They are further useful for inhibition of nitrification and also for the control of undesirable plant species.

A representative pesticide application is in nematode control. In such application, 4-methoxy-2,3,5,6-tetrachloropyridine and 4-methoxy-2,3,5-trichloropyridine are dispersed in water in separate operations to prepare compositions containing one of the 4-methoxypolychloropyridine compounds in an amount of 25 parts by weight per million parts of dispersion. These compositions when separately applied to nematode infested soil and then planted to cucumbers give 100 percent controls of the nematodes.

We claim:
1. A 4-methoxypolychloropyridine compound having the formula

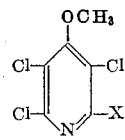

wherein X is selected from the group consisting of hydrogen and chloro.
2. 4-methoxy-2,3,5,6-tetrachloropyridine.
3. 4-methoxy-2,3,5-trichloropyridine.

References Cited by the Examiner

Bremer "Annalen," vol. 529, p. 296 (1937).
"Chemical Abstracts," vol. 51, pp. 8738–9 (1957).
Clarke et al., "J. Chem. Soc." (1960), pp. 1885–95.
Den Hertog et al., "Rec. trav. Chim," vol. 67, pp. 381–3 (1948).
Pfanz et al., "Arch Pharm.," vol. 289, pp. 651–65 (1956).

WALTER A. MODANCE, *Primary Examiner.*
NICHOLAS S. RIZZO, *Examiner.*
ROBERT T. BOND, *Assistant Examiner.*